J. L. GRAYSON.
METER TESTING DEVICE.
APPLICATION FILED JAN. 17, 1921
1,424,899.
Patented Aug. 8, 1922.
2 SHEETS—SHEET 1.
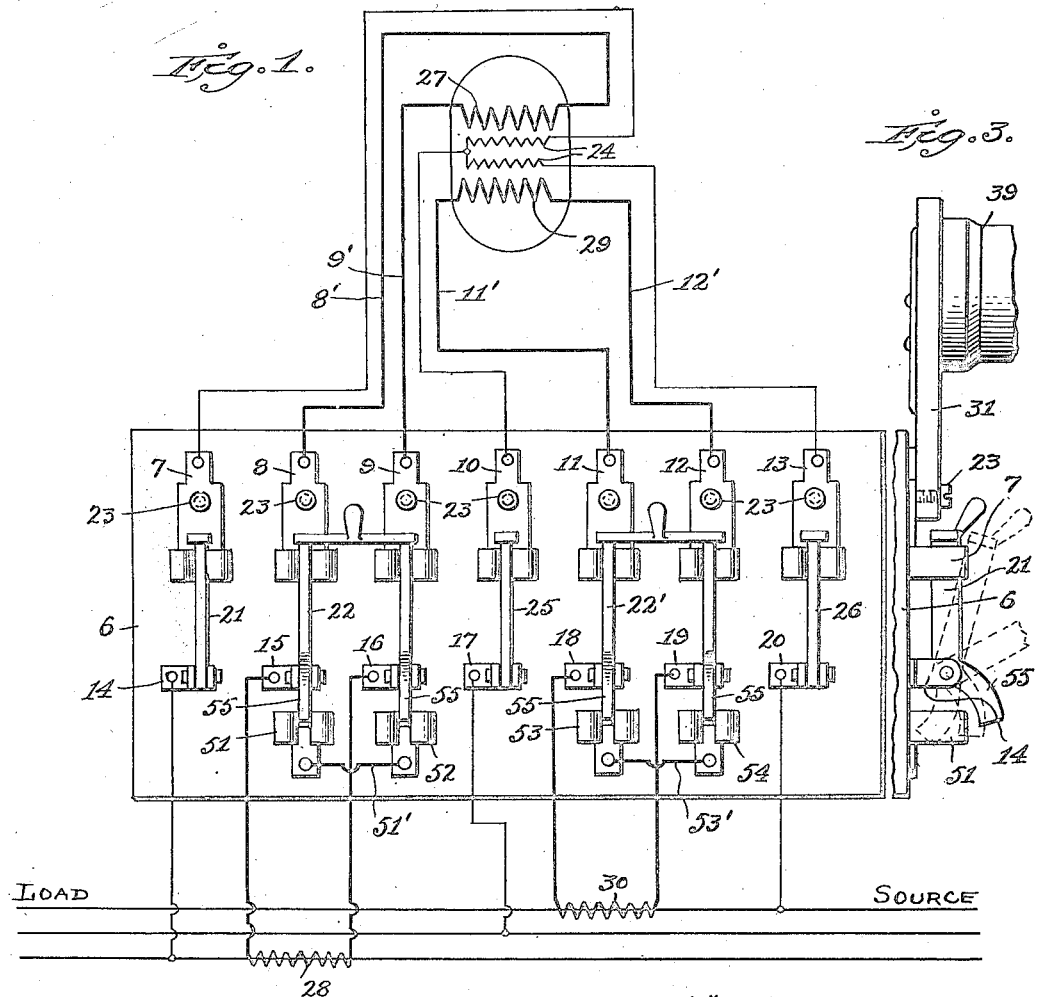
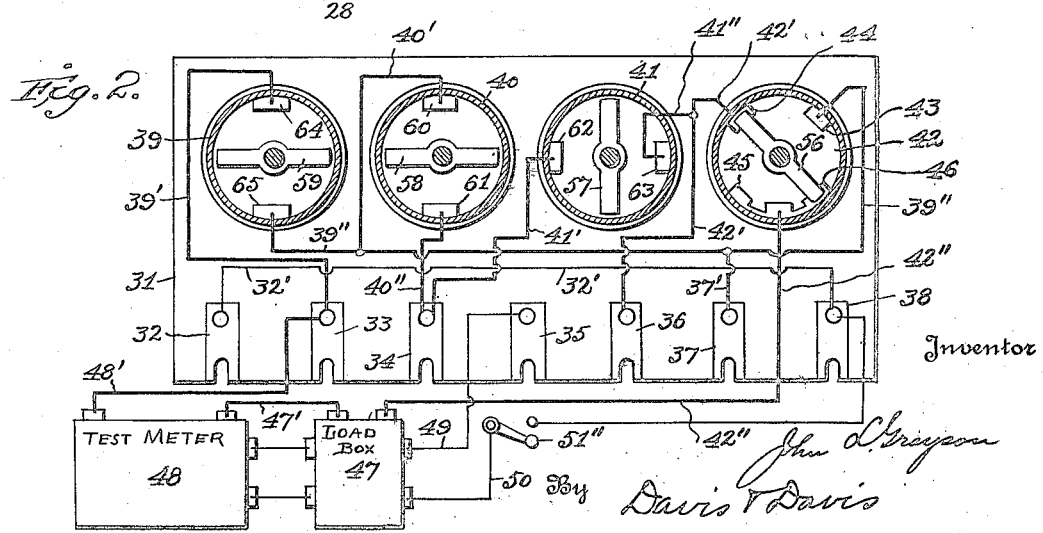

J. L. GRAYSON.
METER TESTING DEVICE.
APPLICATION FILED JAN. 17, 1921.
1,424,899.
Patented Aug. 8, 1922.
2 SHEETS—SHEET 2.
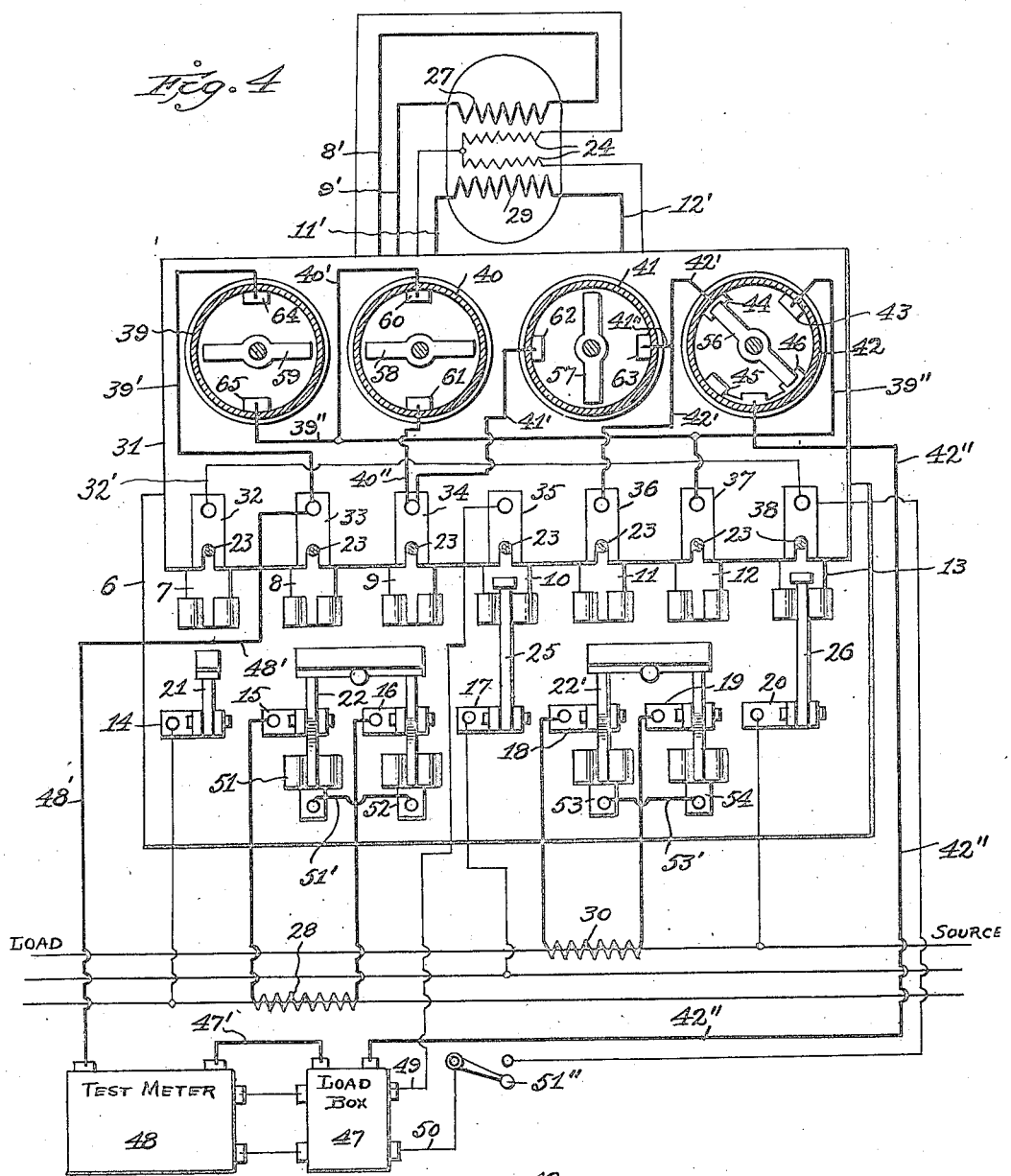
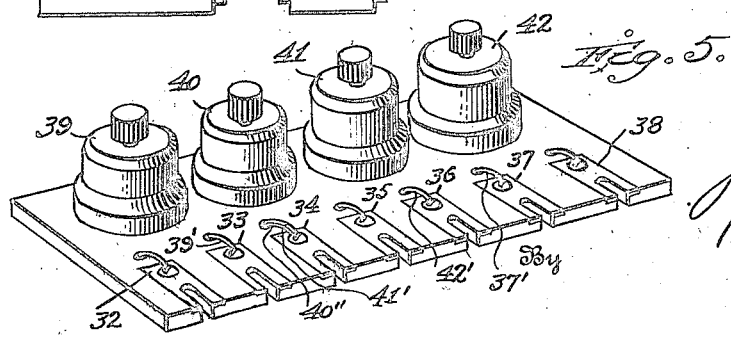
Inventor
John L. Grayson
By Davis & Davis
Attorneys

UNITED STATES PATENT OFFICE.

JOHN LEE GRAYSON, OF MORGANTOWN, WEST VIRGINIA.

METER-TESTING DEVICE.

1,424,899.

Specification of Letters Patent.   Patented Aug. 8, 1922.

Application filed January 17, 1921. Serial No. 437,878.

*To all whom it may concern:*

Be it known that I, JOHN L. GRAYSON, a citizen of the United States of America, and a resident of Morgantown, county of Monongalia, State of West Virginia, have invented certain new and useful Improvements in Meter-Testing Devices, of which the following is a full and clear specification.

This invention relates to improvements in that class of cut-out devices which are designed to be assembled adjacent to and connected to electric meters and are constructed in such manner that the meters can be easily and quickly tested by several different methods to ascertain with certainty the correctness of the meter without interrupting the flow of current to the customers.

This testing device is especially adapted for use in connection with meters of the type used in polyphase circuits, wherein the meters contain upper and lower current-coils and a pair of potential coils. To properly test this class of meters, a series of different tests is necessary which include a series-test, test of the upper and lower current-coils separately, and a balance test which opposes one current-coil against the other. Heretofore, as far as known, a series of tests of this character has never been accomplished without disconnecting and rearranging the permanent connections to the meter terminals, the test-block or the terminal-board, and it is the particular object of this invention to provide a portable terminal-board which can be detachably connected to a test-block and provided with a series of cut-out switches to control different combinations of the wire terminals to make the several tests without disconnecting any terminals.

This and other objects hereinafter set forth are attained by the means illustrated in the accompanying drawings, in which—

Fig. 1 is a diagrammatic view showing a polyphase meter connected indirectly to the line wires through a test-block;

Fig. 2 is a view of the improved terminal-board also shown diagrammatically and connected to a test-meter and phantom load box;

Fig. 3 is a view showing the test-block and terminal-board in edge elevation;

Fig. 4 is a view similar to Fig. 1 with the improved terminal-board mounted in position for testing the meter;

Fig. 5 is a perspective view of the terminal-board, especially adapted for testing 5 ampere polyphase meters.

Similar reference-numerals in all of the figures of the drawings designate like parts.

The test-block illustrated has connections for the attachment of the fixed terminals and meter-leads of a polyphase circuit. The base 6 of the block is preferably constructed of any suitable insulating material and is provided with switch-terminals 7, 8, 9, 10, 11, 12, and 13 adjacent the top-edge, and other switch-terminals 14, 15, 16, 17, 18, 19, and 20 adjacent the opposite edge of the base. The switch-terminals 14, 17 and 20 have single-arm switches 21, 25 and 26 pivoted to them, which are adapted to engage the switch-terminals 7, 10, and 13; and switch-terminals 15—16 and 18—19 have double-arm switches 22 and 22' pivoted to them, which are adapted to connect with the switch-terminals 8—9 and 11—12, respectively. Each of said terminals 7 to 13, inclusive, is provided with a binding-screw 23 for a purpose hereinafter set forth.

The potential coils 24 of the meter are connected on one side with the line through terminal 13, switch-arm 26 and terminal 20; and on the other side through terminal 7, switch-arm 21 and terminal 14; and in the middle, through terminal 10, switch-arm 25 and terminal 17.

The upper current-coil 27 is connected on one side with the current-transformer 28 on the main through terminal 8, one arm or blade of the switch 22, and terminal 15; and on the other side through terminal 9, the other blade of the switch 22 and terminal 16. The lower current-coil 29 is connected on one side with the current-transformer 30 on the main, through terminal 12, one blade of the switch 22' and terminal 19; and on the other side through terminal 11, the other blade of the switch 22' and terminal 18.

The testing terminal-board is constructed with a suitable insulating base 31 and is provided at one edge with notched terminal-plates 32, 33, 34, 35, 36, 37 and 38, the notches of which are adapted to engage over the binding-screws 23 to support the terminal-board in testing position upon the testing-block. This terminal-board is also provided with single pole, singlethrow switches 39, 40 and 41, and a single pole, double throw switch 42, these switches being adapted to be shifted to different positions to form different combinations of circuits for testing purposes.

Switch 39 is connected on one side by the wire 39' to plate 33, and on the other side by the wire 39" to a contact 43 on switch 42. Switch 40 is connected on one side by a wire 40' to wire 39", and on the other side by a wire 40" to plate 34. Switch 41 is connected on one side with a wire 41' with plate 34, and on the other side by a wire 41" to a wire 42' connecting a contact 44 of switch 42 with plate 36. Switch 42 is also provided with a double-contact 45—46 which is adapted to be connected by a wire 42" with a standard phantom load-box 47 which is shown to be connected in series with standard test-meter 48 and plate 33 by the wires 47' and 48'. The test-meter and load-box are also connected to plates 35 and 38 by the wires 49 and 50, a cut-out switch 51" being placed in this circuit. These last-described circuits supply the primary current for the load-box and the potential for the test-meter.

Test-block 6 is also provided with blade-terminals 51—52—53 and 54 positioned in alinement with the terminals 15—16—18 and 19 and are adapted to be engaged by blade-extensions 55 projecting from each of the blades of the double-switch 22. Terminals 51 and 52, as are also terminals 53 and 54, are electrically connected together with the wires 51' and 53' respectively. These switch-blade extensions and the cooperating connected terminals are for the purpose of short-circuiting the circuits of the current-transformers 28 when the double-blade switches are thrown open previous to the testing operation, and it will be observed from inspection of Fig. 3 of the drawing that the blade-extensions will contact with the short-circuiting terminals before the contact is broken with the meter terminals, so that the current-transformer circuits are always closed, thereby avoiding the danger of fatal accidents.

It will be understood that the test-block 6 is part of the permanent installation of the meter connections.

In the operation of testing the meter, the double-blade-switches 22 and 22' are first thrown to open position to short-circuit the transformer-circuits. Either one of the single-blade-switches 21 or 26 (preferably switch 21) is also thrown to open position to cut out one of the potential coils. Then the terminal switch-board is placed on the test-block with its notched terminals engaging over the screw 23 and clamped in position thereby, it being understood that the test-meter and phantom load-box are electrically connected to the terminal switch-board in the manner illustrated and described. The apparatus is now in position for testing with the single pole, double throw switch-blade 56 in engagement with the contacts 44 and 46, and the remaining switch-blades 57, 58 and 59 open, as shown in Fig. 2 and Fig. 4 of the drawing.

To make a series test of the current-coils, blade 56 is in engagement with contacts 44 and 46, and switch-blade 58 is turned to engage the contacts 60 and 61 in switch 40. The test current then travels from one side of the test-meter 48 through 48', 33, 8, 8', upper current-coil 27, 9', 9, 34, 40", 61, 58, 60, 40', 39", 37', 37, 12, 12', lower current-coil 29, 11', 11, 36, 42', 44, 56, 46, 42", load-box 47 and 47', to the opposite side of the test-meter.

To test the upper current-coil alone, blade 56 is in engagement with contacts 44 and 46, and blade 57 is turned to engage contacts 62 and 63 of switch 41, the remaining switches 39 and 40 being open. The test-current will then travel from one side of the test-meter through 48', 33, 8, 8', upper current-coil 27, 9', 9, 34, 41', 62, 57, 63, 41", 42', 44, 56, 46, 42", load-box 47 and 47', to the opposite side of the test-meter.

To test the lower current-coil alone, blade 56 remains in the same position and blade 59 is shifted to engage contacts 64 and 65, the switches 40 and 41 being open. The current then travels from one side of the test-meter through 48', 33, 39', 64, 59, 65, 39", 37', 37, 12, 12', lower current-coil 29, 11', 11, 36, 42', 44, 56, 46, 42", load-box 47 and 47', to the opposite side of the test-meter.

To make a balance test, wherein the current travels in opposite directions through the respective current-coils, blade 56 is shifted into engagement with contacts 43 and 45, and blade 57 is engaged with contacts 62 and 63, the other switches 39 and 40 being open. The current then travels from the test-meter through 48', 33, 8, 8' to the left through upper current-coil 27, 9', 9, 34, 41', 62, 57, 63, 41", 42', 36, 11, 11', to the right through lower current-coil 29, 12', 12, 37, 37', 39", 43, 56, 45, 42', load-box 47 and 47', to the test-meter.

Thus it will be seen that four separate tests are given to the meter without disconnecting the terminals of the permanent terminal connections. In actual practice, these four tests can be made in fifteen to thirty minutes, whereas, heretofore under the old methods of disconnecting the permanent terminals and making numerous other connections, a test of this character could not be made in less than two or three hours. When it is known that the wire service is in operation while a test is being made with the device covered by this application, the advantage of this device over the old methods of testing meters is quite evident. The length of time consumed in making these tests by the old methods is of the utmost importance to the power company, for the meters do not register during the tests; consequently, the cost of many kilowatts is lost to the company. Furthermore, the saving of time in making tests is also an important factor.

It will be observed that in all of the tests the current passes through the single pole, double throw switch 42. Thus the use of this type of switch is a matter of considerable importance, as it reduces the number of switches required on the terminal-board to a minimum for the number of tests made.

It is not desired to limit this invention to the particular form of attaching and contacting means shown and described, viz; screws 23, on the test-block and cooperating notched terminals 32 to 38 inclusive mounted on the terminal-board. Other types of attaching means may be used without departing from the spirit of the invention. Likewise, other forms of circuit cut-out switches may be used in place of switches 21—22, etc.; also the particular arrangement and positions of the contact terminals may be varied.

Preferably, the standard test-meter and phantom load-box are connected to the portable terminal-board in such manner that they can be transported together as a unit with their electrical connections properly secured in position.

The connection 32' connecting the terminal-plates 32 and 38 on the terminal-board connects in parallel the potential coils of the meter.

The nature and scope of the invention having been thus indicated and its preferred embodiment having been specifically described, what is claimed as new is:

1. A testing device for meters embodying a terminal-board provided with a series of contact-terminals adapted to contact with and be supported upon a series of fixed terminals connected to the current and potential circuits of a meter, a series of make-and-break switches secured upon the terminal-board, and a plurality of wire connections permanently mounted on said terminal-board and connecting said make-and-break switches in circuit with said contact-terminals.

2. A testing device for meters embodying a terminal-board provided with a series of contact-terminals adapted to contact with and be supported upon a series of fixed terminals connected with the current and potential circuits of a meter, a series of make-and-break switches secured upon the terminal-board and including a single pole, double throw switch, and a plurality of wire connections permanently mounted on said terminal-board and connecting said make-and-break switches in circuit with said contact-terminals.

3. A testing device for meters embodying a terminal-board having contact-terminals and adapted to be detachably secured in position to engage in the current and potential circuits running to the meter, said terminal-board being provided with a series of cut-out switches including a single pole, double throw switch, and a plurality of electrical connections permanently mounted on said board and connecting said contact-terminals and cut-out switches.

4. A portable testing device for meters embodying a terminal-board having contact-terminals and adapted to be detachably secured in position to engage in the current and potential circuits running to the meter, said terminal-board being provided with a series of cut-out switches and also a single pole, double throw switch, and a plurality of electrical connections permanently mounted on said terminal-board and connecting both the cut-out switches and three-way switch in circuit with said contact-terminals and each of said cut-out switches with said single pole, double throw switch.

5. A portable testing device for meters embodying a terminal-board having contact-terminals and adapted to be detachably secured in position to engage in the current and potential circuits running to a meter, said terminal-board being provided with a series of cut-out switches and also a single pole, double throw switch, wire connections permanently mounted on said terminal-board and connecting each of said cut-out switches in series with said single pole, double throw switch and some of said contact-terminals, a wire connection between two of the contact-terminals not connected to the switches, a standard testing device connected to one of the contact-terminals and adapted to be connected to the cut-out switches and the single pole, double throw switch, and said testing device being also connected in series with one of the contact-terminals not otherwise connected and another one of the contact-terminals not connected to said cut-out or single pole, double throw switch.

6. In combination with a meter and a test-block mounted adjacent thereto, said test-block being provided with a series of switches connected with the current and potential circuits, a terminal-board having a series of contact-terminals constructed to be detachably secured to one set of the terminals of the switches on the test-block and to support the terminal-board, said terminal-board being provided with a series of test-switches and permanently-mounted wire connections between said test-switches and the supporting contact-terminals on the terminal-board.

7. In combination with a meter and a test-block mounted adjacent thereto, said test-block being provided with a series of single and double-blade switches connected with the current and potential circuits, and a series of short-circuit terminals, said double-blade switches being provided with extension-blades constructed to engage said short-circuit terminals when the double switches are opened to break the current-coil circuits, the engagement with the short-circuit terminals being formed before the current-coil circuits are broken, a terminal-board having a series of contact-terminals constructed to be detachably secured to one set of the terminals of the switches on the test-block and to support the terminal-board, said terminal-board being provided with a series of test-switches and permanently-mounted wire connections between said test-switches and the supporting contact-terminals on the terminal-board.

In testimony whereof I hereunto affix my signature.

JOHN LEE GRAYSON.